(12) United States Patent
Mitchell et al.

(10) Patent No.: US 11,239,454 B2
(45) Date of Patent: Feb. 1, 2022

(54) METHODS AND APPARATUSES FOR ENERGY STORAGE DEVICE ELECTRODE FABRICATION

(71) Applicant: Maxwell Technologies, Inc., San Diego, CA (US)

(72) Inventors: Porter Mitchell, Chandler, AZ (US); Jeffrey Nelson, San Diego, CA (US); Robert Crawford, Murrieta, CA (US); Mohammed-Yazid Saidi, La Mesa, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/692,252

(22) Filed: Aug. 31, 2017

(65) Prior Publication Data

US 2018/0062155 A1 Mar. 1, 2018

Related U.S. Application Data

(60) Provisional application No. 62/382,675, filed on Sep. 1, 2016.

(51) Int. Cl.
*H01M 4/04* (2006.01)
*H01M 4/485* (2010.01)
(Continued)

(52) U.S. Cl.
CPC ............ *H01M 4/0457* (2013.01); *B01J 2/006* (2013.01); *B01J 2/16* (2013.01); *B01J 8/1818* (2013.01); *B01J 8/1854* (2013.01); *B01J 8/34* (2013.01); *B01J 8/386* (2013.01); *B01J 8/44* (2013.01); *C25D 17/10* (2013.01); *H01M 4/0435* (2013.01); *H01M 4/1391* (2013.01);
(Continued)

(58) Field of Classification Search
CPC .. H10M 4/0457; H10M 4/8875; H10M 4/622; H10M 4/602
See application file for complete search history.

(56) References Cited

U.S. PATENT DOCUMENTS 6,127,474 A 10/2000 Andelman
6,685,775 B1 † 2/2004 Jensen
(Continued)

FOREIGN PATENT DOCUMENTS

| CN | 101098024 | 1/2008 |
| JP | 10-055802 | 2/1998 |
| JP | 10-116607 | 5/1998 |

OTHER PUBLICATIONS

Büchi Labortechnik AG. "Training papers spray drying." Buchi Corporation (2002).
(Continued)

*Primary Examiner* — Matthew J Merkling
(74) *Attorney, Agent, or Firm* — Knobbe, Martens, Olson & Bear, LLP

(57) ABSTRACT

An apparatus for forming an electrode film mixture can have a first source including a polymer dispersion comprising a liquid and a polymer, a second source including a second component of the electrode film mixture, and a fluidized bed coating apparatus including a first inlet configured to receive from the first source the dispersion, and a second inlet configured to receive from the second source the second component.

26 Claims, 6 Drawing Sheets

(51) Int. Cl.
*H01M 4/62* (2006.01)
*B01J 8/38* (2006.01)
*B01J 8/18* (2006.01)
*B01J 2/16* (2006.01)
*H01M 4/1391* (2010.01)
*B01J 2/00* (2006.01)
*B01J 8/44* (2006.01)
*B01J 8/34* (2006.01)
*C25D 17/10* (2006.01)
*H01M 4/60* (2006.01)
*H01M 4/88* (2006.01)
*H01M 10/052* (2010.01)

(52) U.S. Cl.
CPC .......... *H01M 4/485* (2013.01); *H01M 4/602* (2013.01); *H01M 4/622* (2013.01); *H01M 4/623* (2013.01); *H01M 4/8875* (2013.01); *H01M 10/052* (2013.01)

(56) References Cited

U.S. PATENT DOCUMENTS

| | | | |
|---|---|---|---|
| 7,567,429 | B2 | 7/2009 | Mori |
| 7,753,298 | B2 † | 7/2010 | Basten |
| 8,807,070 | B2 † | 8/2014 | Jensen |
| 9,751,099 | B2 † | 9/2017 | Maher |
| 9,839,926 | B2 † | 12/2017 | Maher |
| 2004/0018430 | A1* | 1/2004 | Holman .................. H01M 4/13 429/233 |
| 2005/0034299 | A1 | 2/2005 | Kurihara |
| 2005/0285080 | A1 | 12/2005 | Suzuki |
| 2009/0155678 | A1 | 6/2009 | Less |
| 2009/0224198 | A1* | 9/2009 | Mori .................. H01M 4/0404 252/62.3 Q |
| 2014/0329126 | A1* | 11/2014 | Ho .......................... H01M 4/13 429/128 |
| 2015/0352568 | A1* | 12/2015 | Maher ...................... B05B 7/02 427/2.14 |
| 2017/0327727 | A1* | 11/2017 | Dreyer .................. C09K 8/528 |

OTHER PUBLICATIONS

Khapli et al., "Supercritical CO2 based processing of amorphous fluoropolymer Teflon-AF: Surfactant-free dispersions and superhydrophobic films." The Journal of Supercritical Fluids 85 (2014): 49-56.

* cited by examiner
† cited by third party

METHODS AND APPARATUSES FOR ENERGY STORAGE DEVICE ELECTRODE FABRICATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present invention relates to energy storage devices, particularly to apparatuses and methods for fabricating energy storage device electrodes.

Description of the Related Art

Various types of energy storage devices can be used to power electronic devices, including for example, capacitors, batteries, capacitor-battery hybrids and fuel cells. Such energy storage devices can have an anode and a cathode comprising one or more electrode films. The electrode films may comprise a polymer binder and one or more active electrode components. An electrical performance of the energy storage device can depend on one or more properties of the binder and active electrode components. Desired electrical performance of the energy storage device may be achieved by selecting the type of binder, active electrode components, and/or processes used for fabricating the electrode film.

However, energy storage device fabrication can invoke considerable costs. In particular, fabrication of electrodes to specification can require substantial resources. One difficulty is removing solvents and other processing additives from electrode films following fabrication. In wet electrode fabrication, solvent removal may require large amounts of power and time during which valuable manufacturing resources will be occupied. Improved fabrication techniques may also afford better performing electrodes due to, for example, providing a more homogeneous distribution of active and binder materials. Conventional dry electrode fabrication techniques avoid some of these problems, but at the cost of introducing other problems discussed further herein. Thus, there is a need for improved electrode fabrication techniques.

SUMMARY

Some embodiments provide an apparatus for forming an energy storage device electrode film mixture. The apparatus includes a first source comprising a polymer dispersion, the polymer dispersion comprising a liquid and a polymer. The polymer is a first component of an energy storage device electrode film mixture. The apparatus further includes a second source comprising a second component of the energy storage device electrode film mixture. The apparatus further includes a fluidized bed coating apparatus, comprising a first inlet configured to receive from the first source the polymer dispersion, and a second inlet configured to receive from the second source the second component of the electrode film mixture.

Further embodiments provide a method for preparing an energy storage device electrode film mixture. The method includes providing to a first inlet of a fluidized bed coating apparatus a polymer dispersion, the polymer dispersion comprising a liquid and a polymer, wherein the polymer is a first component of an energy storage device electrode film mixture. The method further includes providing a second component of the energy storage device electrode film mixture within the fluidized bed coating apparatus. The method further includes vaporizing the liquid portion of the polymer dispersion within the fluidized bed coating apparatus to form a dried polymer. The method further includes forming a fluidized bed comprising the second component of the electrode mixture within the fluidized bed coating apparatus.

In a first aspect, an apparatus for forming an energy storage device electrode film mixture is provided, comprising a first source comprising a polymer dispersion, the polymer dispersion comprising a liquid and a polymer, wherein the polymer is a first component of an energy storage device electrode film mixture, a second source comprising a second component of the energy storage device electrode film mixture, and a fluidized bed coating apparatus comprising a first inlet configured to receive the polymer dispersion from the first source, and a second inlet configured to receive the second component from the second source to form the electrode film mixture.

In some embodiments of the first aspect, the apparatus is configured to vaporize the liquid of the dispersion to provide a dried polymer, and form a fluidized bed with the second component, and coat the second component with the dried polymer.

In some embodiments of the first aspect, the second component comprises dry particles, and the fluidized bed coating apparatus is configured to form a fluidized bed from the dry particles.

In some embodiments of the first aspect, the second component comprises an active electrode component of the electrode film mixture.

In some embodiments of the first aspect, the second component comprises a lithium metal oxide.

In some embodiments of the first aspect, the second component comprises a carbon.

In some embodiments of the first aspect, the second component comprises graphite.

In some embodiments of the first aspect, the polymer comprises polytetrafluoroethylene.

In some embodiments of the first aspect, the liquid comprises water.

In some embodiments of the first aspect, the second component comprises dry particles, and the fluidized bed coating apparatus is configured to receive the dry particles through the second inlet and form a fluidized bed from the dry particles.

In some embodiments of the first aspect, the fluidized bed coating apparatus is configured to vaporize the water and provide a dried polytetrafluoroethylene coating on the dry particles.

In some embodiments of the first aspect, the fluidized bed coating apparatus is configured to provide a continuous volume of gas to form a fluidized bed with the second component.

In some embodiments of the first aspect, the apparatus comprises a rotor.

In a second aspect, a method for preparing an energy storage device electrode film mixture is provided, comprising providing a polymer dispersion to a first inlet of a fluidized bed coating apparatus, the polymer dispersion comprising a liquid and a polymer, wherein the polymer is a first component of an energy storage device electrode film mixture, providing a second component of the energy storage device electrode film mixture to a second inlet of the fluidized bed coating apparatus, vaporizing the liquid portion of the polymer dispersion within the fluidized bed coating apparatus to form a dried polymer, and forming a fluidized bed of the dried polymer and the second component of the electrode mixture within the fluidized bed coating apparatus to form an electrode film mixture.

In some embodiments of the second aspect, providing the polymer dispersion comprises providing a dispersion comprising water and polytetrafluoroethylene.

In some embodiments of the second aspect, providing the second component comprises providing dry particles.

In some embodiments of the second aspect, providing the second component comprises providing an active electrode component of the electrode film mixture.

In some embodiments of the second aspect, providing the second component comprises providing a carbon.

In some embodiments of the second aspect, providing the carbon comprises providing graphite.

In some embodiments of the second aspect, providing the second component comprises providing a lithium metal oxide.

In some embodiments of the second aspect, vaporizing the liquid of the dispersion comprises passing the dispersion through a spray nozzle of the fluidized bed coating apparatus.

In some embodiments of the second aspect, the method comprises coating the second component with the dried polymer within the fluidized bed coating apparatus.

In some embodiments of the second aspect, providing the second component is performed prior to providing the polymer dispersion.

In some embodiments of the second aspect, a method of forming an electrode film is provided, comprising calendering the electrode film mixture to form an electrode film.

In some embodiments of the second aspect, calendering the electrode film mixture comprises fibrillizing the polymer.

In some embodiments of the second aspect, the electrode film is self-supporting.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Figure 1:
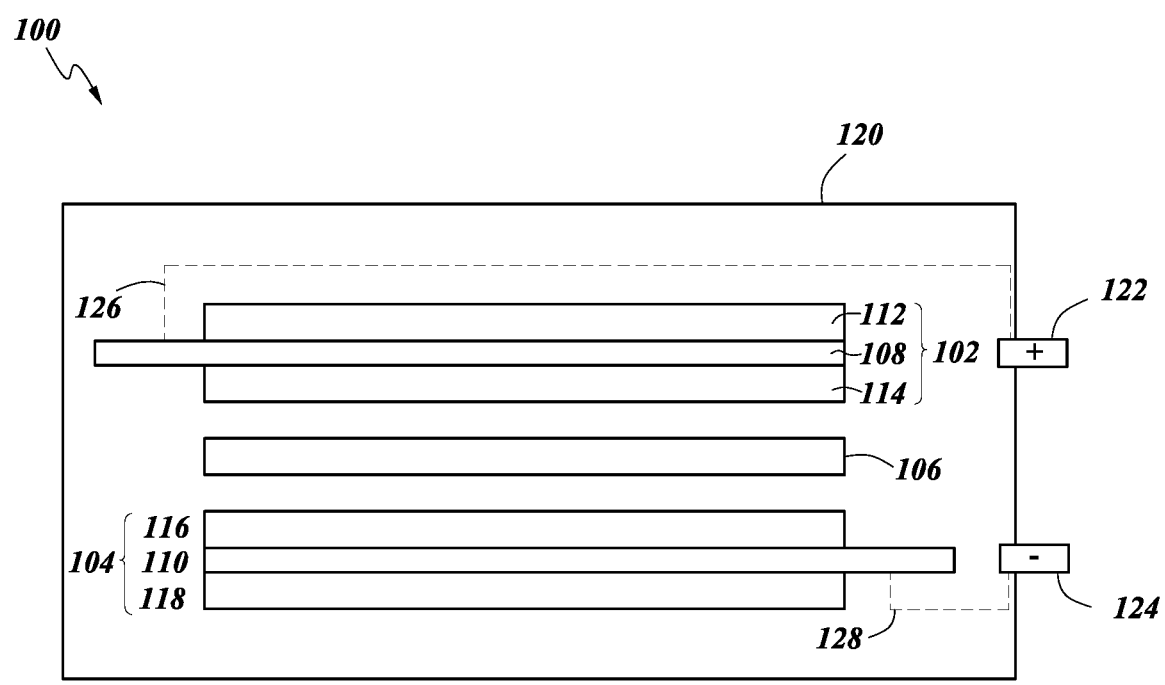
FIG. 1 is a schematic diagram of an energy storage device comprising one or more electrode films.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Provided herein are apparatuses and processes for forming an energy storage device electrode film mixture. The apparatus or process may provide a first component of an electrode film mixture, which may comprise a polymer dispersion, the polymer dispersion comprising a liquid and a polymer. The apparatus or process may further provide a second component of the electrode film mixture, which may comprise an active material. The apparatus or process may further provide a fluidized bed in fluid communication with a first inlet configured to receive the polymer dispersion, and a second inlet configured to receive the second component of the electrode film mixture.

Apparatuses or processes described herein may provide one or more advantages compared to conventional apparatuses or processes for forming wet or dry electrode films, or the raw materials used to form such films. For example, one or more apparatuses or processes described herein may facilitate formation of thicker electrode films to provide increased device energy density performance, compared to electrode films fabricated using wet coating processes. For further example, one or more apparatuses or processes described herein may reduce manufacturing costs compared to other electrode manufacturing apparatuses or processes.

Some conventional electrode film processes use wet raw materials to form a slurry, which is subsequently applied to a current collector, and dried to form an electrode film. The rate at which such wet electrode films are dried may be affected by the drying kinetics of one or more solvents of the slurry used in the wet coating processes. The rate at which the electrode films can be dried may also be affected by the thickness of the electrode films. For example, the rate at which thicker electrode films are dried is often decreased to reduce or avoid drying defects. The vaporization kinetics of the one or more solvents may thereby affect the duration of a drying step used to achieve desired drying of the electrode film, and/or the physical length of the dryer used to dry such electrode films. The duration of drying and the length of the dryer may contribute to the cost of fabricating such electrodes. While thicker electrodes may be desired to provide higher device energy density, the cost for manufacturing electrode films beyond a certain thickness may be prohibitive. For example, the cost of equipment used to dry the wet-coated electrode films may rise more than proportionally, for example approximately exponentially, as the length of the dryer ovens increases. The thickness of electrode films fabricated using wet coating processes may then be limited by the drying kinetics of one or more solvents used in the slurry, and thus the drying resources required to achieve satisfactory results. Provided herein are apparatuses and methods for fabrication of electrode films for lithium ion based energy storage devices without the use of drying equipment or a discrete drying step, and/or without a step of drying of an electrode film.

Conventional dry electrode film processes use dry raw materials, which reduce or eliminate the need for the dryers required in wet-electrode film processes such as those described above. Such dry electrode film fabrication processes use high-shear equipment and processes, such as jet-milling, to provide sufficient shear for reducing in size and/or fibrillizing a binder material. Such processes may be limited to using only a fibrillizable binder, or even more limited to only using a single, specific binder, such as polytetrafluoroethylene (PTFE). For example, a mixture comprising a binder material, such as PTFE, and other electrode film components, may be jet-milled such that high shear forces can be provided to separate the binder material agglomerates into finely divided particles and/or fibrillize the binder material, such that the binder material can coat the other electrode film components. The resulting dry processed powder may be compressed with heat and pressure using a roll mill to form a film, such as by the PTFE cohering and adhering to other components of the film, for example, in a fibrillized matrix. The thickness of the film may depend on the roll gap of the roll mill, pressure applied during the compression process, and/or number of times the film is compressed. The dry fabrication process may result in a fibrillized matrix such that the electrode film is a self-supporting electrode film. As provided herein, a "self-supporting" electrode film is an electrode film that incorporates binder matrix structures sufficient to support the film and maintain its shape such that the electrode film can be a free-standing film. When incorporated in an energy storage device, a self-supporting electrode film is one that incorporates such binder matrix structures. Generally, and depending on the methods employed, such self-supporting electrode films are strong enough to be employed in energy storage device fabrication processes without any outside supporting elements. For example, a self-supporting electrode film can be handled, and rolled, without additional supporting elements.

However, such high-shear processes as used in typical dry electrode fabrication may damage one or more other components of the electrode film mixture. This damage may reduce performance of a device with an electrode that is formed from these components. For example, use of a jet-milling process to exert high shear forces to separate the binder material agglomerates and/or fibrillize the binder material may undesirably degrade surface properties of one or more other components of the electrode film mixture. The forces applied in high shear processing may alter the form of the active material or materials, and/or may damage the surface of the active material. For example, the particles of active material may break, fuse, strip, or be chemically altered during such processing.

Active materials as incorporated in energy storage device electrodes may have coated and/or treated surfaces. For example, carbon materials, and in particular graphitic materials, may be coated with amorphous carbon. Alternatively or in addition, graphitic materials may be surface treated to reduce the first cycle inefficiencies during formation of solid electrolyte interphase, or improve cell cycle life. For example, one or more surface properties of carbon in the electrode film mixture may be degraded, without the use of an amorphous carbon surface coating of graphite particles. Such degradation in surface properties may negatively affect one or more electrical properties of the energy storage device.

Without wishing to be limited by theory, it is thought that the composition of the active material surface affects degradation processes within the energy storage device, e.g., of the electrolyte and impurities therein, and also affects formation of a solid-electrolyte interphase (SEI) layer. Surface-treated active materials may exhibit better performance in an energy storage device electrode compared to active material(s) having untreated surfaces. Better performance may be due to, for example, reduced fissure formation and/or cracking, reduced separation of active material(s) from a current collector, reduced decomposition of the electrolyte, and/or reduced gassing. Thus, a dry electrode film fabricated using dry electrode film material made from one or more processes described herein may demonstrate improved electrical properties, for example, due to improved integrity of one or more components of the electrode film.

Disclosed herein are materials and methods providing active material(s) incurring reduced surface damage during fabrication. Certain embodiments of energy storage devices provided herein may provide reduced surface damage graphitic materials following processing. In particular, self-supporting electrode films including such active material(s) are provided. One or more processes described herein may avoid exposing electrode film components to high shear forces, facilitating preservation of the integrity of the components. In some embodiments, manufacturing costs may be reduced when reducing or eliminating the use of jet-mills, or other high-shear apparatus, and associated equipment, such as air compressors and/or associated mixers.

Additionally, electrode films fabricated using typical dry electrode fabrication processes, including high shear processes, may be limited to those binder materials which are fibrillizable using high shear forces, such as, for example, PTFE. Thus, typical dry electrode fabrication processes may limit the choice of binder, which may in turn limit the materials used in the energy storage device. As an example, use of PTFE binder may lead to reduced performance, reduced cell life, or even be incompatible with the materials used in certain types of energy storage devices, and may be, for example, incompatible with one or more other components of certain electrode films. For example, PTFE may be an unsuitable binder for certain electrode film applications due to its potential reactivity with lithium ions. One or more processes described herein can be compatible with binder materials other than PTFE, thereby facilitating use of binder materials which are more compatible with lithium to fabricate electrodes for use in lithium ion based energy storage devices. Thus, provided herein are dry electrode processes that are compatible with binders used as an alternative to or in combination with PTFE.

In some embodiments, energy storage device electrode film mixtures, and processes and apparatuses for preparing such electrode film mixtures, are provided. The electrode film mixture may include a first component, which may comprise a polymer dispersion, and a second component, which may comprise an active material. In some embodiments, an electrode film mixture comprises particles of an electrode film component coated by a polymer binder, the electrode film component being a different material from the polymer. For example, the polymer may be a polymer binder, such as PTFE. In some embodiments, the electrode film component can comprise an active electrode material.

In some embodiments, the electrode film component can comprise a carbon, such as graphite, activated carbon, soft carbon, and/or hard carbon. The electrode film component can comprise a carbon composite with a metal oxide. In some embodiments, the electrode film component can comprise an intercalatable metal oxide, such as a lithium metal oxide. The electrode film component can comprise amorphous carbon. The electrode film component can comprise a composite of two or more carbons, such as graphitic and amorphous carbons. The electrode film mixture may comprise a plurality of graphite particles coated with PTFE. The term "coated" can include a substantially continuous film of the polymer binder surrounding and covering each of the electrode film component (e.g., an active material such as graphite) particles, for example, through induced dipole interactions and/or London forces which cause the polymer to form a plurality of particles which coalesce and surround the electrode film component (e.g., an active material such as graphite) particles.

In some embodiments, an apparatus for fabricating one or more electrode film mixtures described herein comprises a first source for providing a first component of an electrode film mixture, for example, which has a dispersion comprising the polymer, and a second source comprising a second component of the electrode film mixture, and a fluidized bed coating apparatus. The fluidized bed coating apparatus can be any known in the art that can be configured to receive the dispersion and the second electrode film mixture component, such as a Wurster accelerator. In further embodiments, the fluidized bed coating apparatus may comprise a conical rotor processor. The fluidized bed coating apparatus may comprise a first inlet to receive the polymer dispersion and a second inlet to receive the second electrode film mixture component. In further embodiments, the second electrode film mixture component may be added batchwise. In still further embodiments, the polymer dispersion and the second electrode film mixture component may be added in a continuous flow process. It will be understood that although some embodiments are described herein within the scope of a Wurster accelerator, other types of fluidized bed coating apparatus can be implemented while still being within the scope of the invention.

As provided herein, a "dispersion," and including a "polymer dispersion" is a composition including a solid or semisolid particulate, dispersed in a liquid phase. The solid or semisolid particulate may be a polymer as provided herein. A dispersion as provided herein may be a solution of the solid or semisolid in the liquid.

The fluidized bed coating apparatus can include typical components, for example, one or more spray nozzles or spray guns, a processing chamber, a rotating disc or rotor, a stationary container or stator, and an air duct or aperture.

In some embodiments, a process for preparing one or more electrode film mixtures described herein comprises providing to the first inlet of the fluidized bed coating apparatus from the first source the dispersion comprising the polymer. The process can include providing the second electrode film mixture component within the fluidized bed apparatus. For example, the second electrode film mixture component can be provided to the second inlet of the fluidized bed coating apparatus from the second source. In some embodiments, the second electrode film mixture component can be dispersed and fluidized by a continuous volume of heated gas or air, to form a fluidized bed. In some embodiments, the liquid of the polymer dispersion can be vaporized by the heated air within the fluidized bed coating apparatus to provide a dried polymer. The dried polymer and the fluidized bed can be provided within the fluidized bed coating apparatus at the same time such that the second electrode film mixture component can be coated by the dried polymer. For example, a dispersion comprising PTFE may be provided into the first inlet of the fluidized bed coating apparatus, and dry particles of graphite may be provided into the second inlet of the fluidized bed coating apparatus such that a fluidized bed comprising the graphite particles can be formed. The liquid portion of the polymer dispersion may be vaporized within the fluidized bed coating apparatus such that dried PTFE coats the dry particles of graphite as a film and/or as small particles adhering to the surface of the graphite within the fluidized bed coating apparatus. The second electrode film mixture component can be within the fluidized bed coating apparatus prior to the step of providing the polymer dispersion.

In some embodiments, the binder is not PTFE. In further embodiments, the polymer dispersion does not comprise PTFE.

In some embodiments, one or more electrode film mixtures described herein may be combined with one or more other components of the electrode film mixture and subsequently calendered to form an electrode film. The other components may be, for example, a third electrode film mixture component. The third electrode film mixture component can be combined with the electrode film mixture following a coating process as described herein. For example, the third electrode film mixture component can be added to the electrode film mixture comprising the first component and the second component thereof. Alternatively or in addition, the third electrode film mixture component can be combined with the first component and/or the second component prior to mixing in the fluidized bed apparatus. As a nonlimiting example, the third electrode film mixture component can be dispersed in the liquid of the polymer dispersion.

The third electrode film mixture component may comprise additional binder materials, which may be the same or different as those included in the polymer dispersion. The additional binder material may be any provided herein. The additional binder may be, or may comprise, for example, PTFE. Alternatively or in addition, the third electrode film mixture component may comprise, for example, additional active materials. The active materials can be any described herein, and may be, for example, a carbon material or a metal oxide. Alternatively or in addition, the third electrode film mixture component may comprise, for example, a conductive electrode film material.

The electrode film may be used to form an anode or cathode for use in an energy storage device. For example, the electrode film may be coupled to a current collector of an anode or cathode, such as by using a lamination process. The electrode films described herein can be used to form anodes and/or cathodes of an energy storage device, for example, batteries, capacitors, capacitor-battery hybrids, fuel cells, combinations thereof, and the like. The energy storage device may operate with or without lithium. In some embodiments, the electrode films can be used to fabricate batteries, such as lithium ion batteries, or other metal ion batteries. In some embodiments, the electrode films can be used to fabricate ultracapacitors, such as electric double layer capacitors (EDLC). In some embodiments, the electrode films can be used to fabricate lithium ion capacitors. The electrode film may be a self-supporting electrode film as provided herein.

FIG. 1 shows a side cross-sectional schematic view of an example of an energy storage device 100. The energy storage device 100 may be any number of energy storage devices, such as a lithium ion capacitor, lithium ion battery, or an electric double layer capacitor. Of course, other energy storage devices are within the scope of the invention, and device 100 can be other types of capacitors, batteries, capacitor-battery hybrids, or fuel cells. The energy storage device 100 can have a first electrode 102, a second electrode 104, and a separator 106 positioned between the first electrode 102 and second electrode 104. For example, the first electrode 102 and the second electrode 104 may be placed adjacent to respective opposing surfaces of the separator 106. The first electrode 102 may comprise a cathode and the second electrode 104 may comprise an anode, or vice versa. The energy storage device 100 may include an electrolyte to facilitate ionic communication between the electrodes 102, 104 of the energy storage device 100. For example, the electrolyte may be in contact with the first electrode 102, the second electrode 104 and the separator 106. The electrolyte, the first electrode 102, the second electrode 104, and the separator 106 may be received within an energy storage device housing 120. For example, the energy storage device housing 120 may be sealed subsequent to insertion of the first electrode 102, the second electrode 104 and the separator 106, and impregnation of the energy storage device 100 with the electrolyte, such that the first electrode 102, the second electrode 104, the separator 106, and the electrolyte may be physically sealed from an environment external to the housing.

The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a variety of porous or nonwoven electrically insulating materials. In some embodiments, the separator 106 can comprise a polymeric material. The separator 106 can comprise a composite of polymeric materials. The separator 106 can comprise a composite of one or more polymeric materials with a ceramic, and/or metal oxide. The ceramic or metal oxide can be a powder. For example, the separator 106 can comprise a cellulosic material, such as paper. The separator 106 can comprise a porous or nonwoven polyethylene (PE) material. The separator 106 can comprise polytetrafluoroethylene material, such as a porous polytetrafluoroethylene material. The separator 106 can comprise a polypropylene (PP) material, such as a porous or nonwoven polypropylene (PP) material. The separator 106 can comprise a polyethylene coating, for example, on a porous or nonwoven polypropylene material or a composite of polymeric materials.

As shown in FIG. 1, the first electrode 102 and the second electrode 104 can include a first current collector 108, and a second current collector 110, respectively. The first current collector 108 and the second current collector 110 may facilitate electrical coupling between the corresponding electrode and an external circuit (not shown). The first current collector 108 and the second current collector 110 can comprise one or more electrically conductive materials. The first current collector 108 and the second current collector 110 can have various shapes and/or sizes. The first current collector 108 and the second current collector 110 can be configured to facilitate transfer of electrical charges between the corresponding electrode and an external circuit. For example, the first current collector 108 can be electrically coupled to a first energy storage device terminal 122, such as an electrically positive terminal, via a first connection 126. The second current collector 110 may be electrically coupled to a second energy storage device terminal 124, such as an electrically negative terminal, via a second connection 128. The first and second energy storage device terminals, 122, 124, may be electrically coupled to respective terminals of an external circuit to couple the energy storage device 100 to the external circuit.

A current collector can include a metallic material, such as a material comprising aluminum, nickel, copper, silver, alloys thereof, and/or other metallic materials, or nonmetallic materials such as graphite which remain inert at the electrode potentials of the device. The first current collector 108 and/or the second current collector 110 can comprise a foil. The first current collector 108 and the second current collector 110 can have a rectangular or substantially rectangular shape and can be dimensioned to provide desired transfer of electrical charges between the corresponding electrode and an external electrical circuit. The energy storage device 100 can comprise any of a number of different configurations to provide said electrical communication between the electrodes 102, 104 and the external electrical circuit through the current collectors 108, 110, respectively. For example, said transfer can be provided via a current collector plate and/or another energy storage device component.

The first electrode 102 may have a first electrode film 112 (e.g., an upper electrode film) on a first surface of the first current collector 108 (e.g., on a top surface of the first current collector 108). The first electrode 102 may have a second electrode film 114 (e.g., a lower electrode film) on a second opposing surface of the first current collector 108 (e.g., on a bottom surface of the first current collector 108). Similarly, the second electrode 104 may have a first electrode film 116 (e.g., an upper electrode film) on a first surface of the second current collector 110 (e.g., on a top surface of the second current collector 110). The second electrode 104 may have a second electrode film 118 on a second opposing surface of the second current collector 110 (e.g., on a bottom surface of the second current collector 110). For example, the first surface of the second current collector 110 may face the second surface of the first current collector 108, such that the separator 106 is adjacent to the second electrode film 114 of the first electrode 102 and the first electrode film 116 of the second electrode 104.

The electrode films 112, 114, 116 and/or 118 can have a variety of suitable shapes, sizes, and/or thicknesses. For example, the electrode films can have a thickness of about 30 microns (μm) to about 2000 microns, including about 100 microns to about 250 microns, and further including about 30 microns to about 250 microns. The electrode films of 112, 114, 116 and/or 118 can have the same or different thicknesses, compositions, and densities with respect to each other. For example, the electrode films of 112 and 114 can have a different thickness, composition or density compared to the electrode films 116 and 118.

In some embodiments, an electrode film of an anode and/or a cathode of an energy storage device comprises an electrode film mixture comprising a polymer, such as a polymer binder material, and one or more other components. Polymer is a general term and can include homo-polymers, co-polymers, and admixtures of polymers as provided herein. In some embodiments, the electrode film of an anode and/or a cathode can include one or more active electrode components. In some embodiments, the active electrode components are carbon-based. In some embodiments, the one or more active electrode components comprise a porous carbon material, such as activated carbon. In some embodiments, the one or more active electrode components comprise carbon configured to reversibly intercalate lithium ions, such as graphite, soft carbon and/or hard carbon. In some embodiments, the active electrode component comprises a lithium metal oxide. In some embodiments, the electrode film of an anode and/or a cathode can include one or more additives, including electrical or ionic conductivity promoting additives. In some embodiments, the electrical conductivity promoting additive can be carbon black. In some embodiments, the electrode film mixture comprises the binder material, one or more active electrode components, and/or one or more electrical conductivity promoting additives. In some embodiments, a binder material can include one or more of a variety of suitable polymeric materials, such as polytetrafluoroethylene (PTFE), ultra-high molecular weight polyethylene (UHMWPE), a binder provided herein, and/or other suitable and optionally fibrillizable materials, used alone or in combination. In some embodiments the active electrode components incorporate a lithium ion rich source for the purpose of pre-lithiating the anode, advantageously reducing or eliminating first cycle inefficiency.

Figure 2:
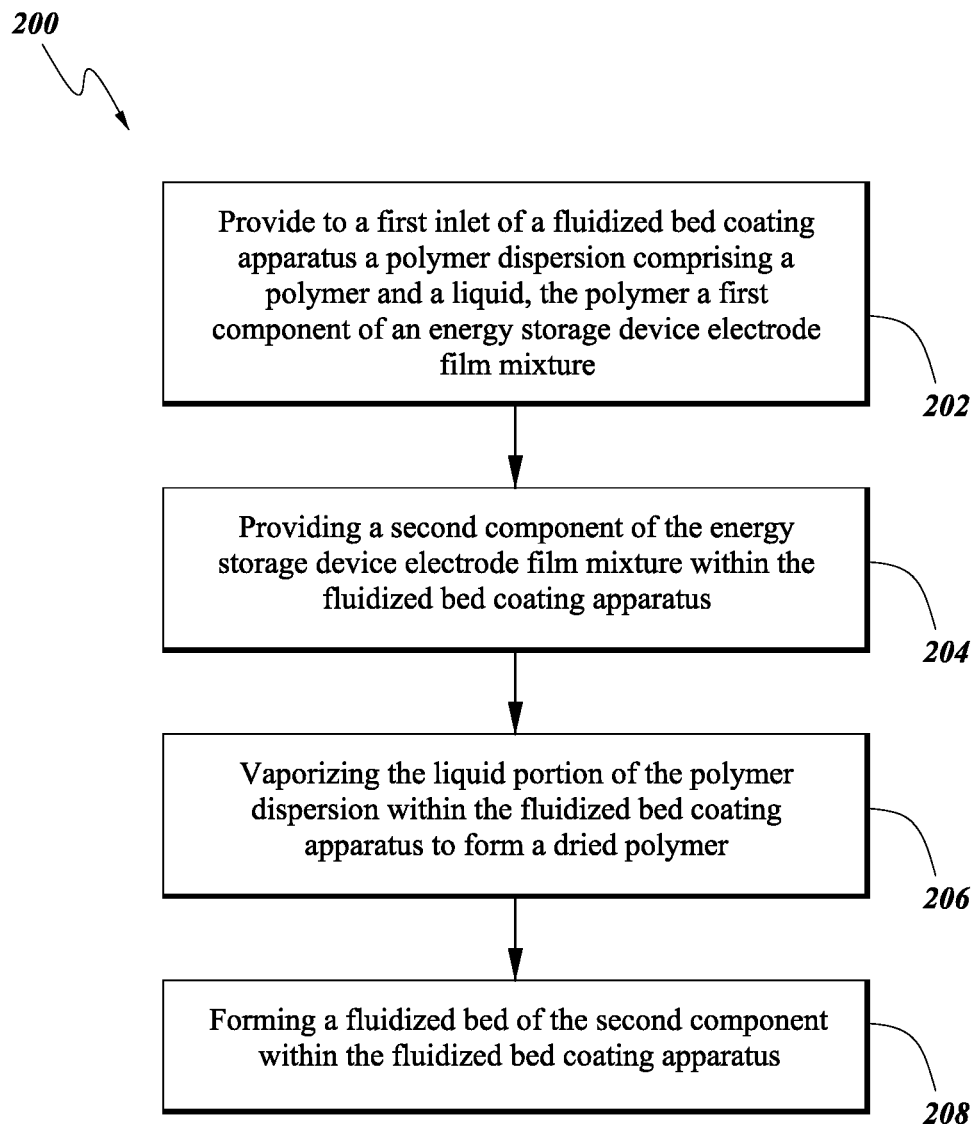
FIG. 2 is a process flow diagram of an embodiment of a process for forming an electrode film mixture.

FIG. 2 is a process flow diagram of an embodiment of a process 200 for forming an electrode film mixture. In block 202, a first electrode film mixture component, such as a polymer dispersion, is provided to a first inlet of a fluidized bed coating system, which can also be known as a "spray drier." Block 202 can include spraying the polymer dispersion into a spray chamber of the apparatus, for example, through a spray nozzle. The polymer dispersion comprises, consists essentially of, or consists of a liquid, and solid or semisolid polymer particles dispersed within the liquid. In some embodiments, the liquid can comprise, consist essentially of, or consist of water. For example, the polymer dispersion can be a water-based dispersion. In some embodiments, the liquid can comprise, consist essentially of, or consist of one or more other solvents known to persons of skill in the art and typical in a polymer solution or dispersion. In some embodiments, the polymer comprises, consists essentially of, or consists of an electrode film binder material. The electrode film binder material can comprise a material which remains electrochemically inert during operation of the energy storage device. The electrode film binder material can be either dispersed as a fine particulate within a carrier fluid, or can be dissolved within a solvent, or a combination of dispersed and dissolved. The electrode film binder material can mechanically form a film when mixed with energy storage active materials. Other types of polymers which can be used include but are not limited to thermoplastics, thermosets or elastomers. The polymer may be an admixture of two or more polymers, or a copolymer. The copolymer may be a graft, block, or random copolymer, or a combination thereof. Some polymers include those provided herein, and may specifically include carboxymethyl cellulose, styrene butadiene and co-polymers, polyvinylidene fluoride and co-polymers of polyvinyidene fluoride-co-hexafluropropylene, polyacrylic acid, polymethacrylic acid, and admixtures and copolymers thereof, for example. In some embodiments, the polymer comprises, consists essentially of, or consists of PTFE. For example, the polymer dispersion can be a water-based dispersion comprising, consisting essentially of, or consisting of PTFE. In some embodiments, the polymer dispersion is a commercially available water-based dispersion comprising particles of PTFE. In some embodiments, the polymer dispersion may be a suspension. In further embodiments, the polymer dispersion may be a solution. In still further embodiments, the polymer may not be dissolved in the liquid.

In block 204, a second electrode film mixture component of the electrode film mixture is separately provided, relative to the first electrode film mixture component within the fluidized bed coating apparatus. Block 204 can comprise providing the second component to a second inlet of the fluidized bed coating apparatus, and into the fluidized bed coating apparatus. Thus, the first and second electrode film mixture components can remain separate from each other until they are within the coating chamber of the fluidized bed coating apparatus. Generally, the first inlet and the second inlet are components downstream of the first source and the second source, respectively, and provide fluid connection with the coating chamber of the fluidized bed apparatus. Block 204 can include providing the second component at a different time (e.g., prior to), or concurrently with, the step of providing the polymer dispersion in block 202. In some embodiments, the second component is a material different from the polymer dispersion of block 202. In some embodiments, the second component is in dry particles form. The second component can comprise, consist essentially of, or consist of an active electrode material. For example, the second component may comprise, consist essentially of, or consist of dry particles of an active electrode material. In some embodiments, the second component comprises, consists essentially of, or consists of an active electrode material of a cathode or an anode of an electric double-layer capacitor. In some embodiments, the second component comprises, consists essentially of, or consists of an active electrode material of a cathode or an anode of a lithium ion capacitor. In some embodiments, the second component comprises, consists essentially of, or consists of an active electrode material of a cathode or an anode of an electrochemical battery, including a lithium ion battery. In some embodiments, the second component comprises, consists essentially of, or consists of a carbon. In some embodiments, the carbon can comprise, consist essentially of, or consist of graphite, soft carbon and/or a hard carbon. In some embodiments, the carbon comprises, consists essentially of, or consists of activated carbon. In some embodiments, the second component comprises, consists essentially of, or consists of a lithium metal oxide. For example, the second component may comprise one or more of, consist essentially of, or consist of lithium nickel manganese cobalt oxide (NMC), lithium manganese oxide (LMO), lithium iron phosphate (LFP), lithium cobalt oxide (LCO), and lithium nickel cobalt aluminum oxide (NCA) or other lithiated metal oxide materials suitable for use as a cathode in a rechargeable lithium ion battery.

In block 206, the liquid portion of the polymer dispersion can be vaporized within the coating chamber of the fluidized bed coating apparatus. For example, the liquid portion of the dispersion may be evaporated, resulting in a dried polymer. In some embodiments, the fluidized bed coating apparatus comprises a spray nozzle for distributing the polymer dispersion within the fluidized bed coating apparatus. The spray nozzle, such as an atomizing spray nozzle or ultrasonic spray nozzle, may be configured to inject fine droplets of the polymer dispersion into the coating chamber of the fluidized bed coating apparatus. In some embodiments, one or more components of the fluidized bed coating apparatus are heated directly or indirectly with heated fluidizing air to control the temperature to which the droplets are exposed so as to achieve desired vaporization of the liquid portion of the polymer dispersion. The temperatures of one or more components of the fluidized bed coating apparatus may be controlled to control the temperature within the coating chamber. In some embodiments, one or more sidewalls of the coating chamber may be heated. In some embodiments, the spray nozzle may be heated. In some embodiments, the polymer dispersion may be heated prior to introduction into the coating chamber. In some embodiments, the second component, such as the active material, can be preheated prior to introduction of the polymer dispersion which can help control the evaporation rate of the liquid portion of the polymer dispersion. The droplets may be exposed to heat, for example heat from a heated spray nozzle and/or heated fluidizing air or one or more heated sidewalls of the coating chamber, such that the liquid portion of the polymer dispersion is vaporized within the coating chamber to provide a dried polymer. Thus, the vaporization step 206 can include heating the polymer dispersion before, during, and/or after the polymer dispersion is introduced (e.g., sprayed) into the coating chamber. Other ways of vaporizing the polymer dispersion, or otherwise providing heat to the process, include, for example, by heating the walls of a coating chamber of the fluidized bed coating apparatus, either directly or indirectly. For example, the vaporization can be provided with the heated gas which also fluidizes the bed of powder of the second electrode film component in block 208, as described below. The polymer dispersion itself can be heated, and/or the spray nozzle can be heated. A microwave generator, IR lamp, oven, or other heat source can be used to preheat the polymer dispersion and/or the second component of the energy storage device electrode prior to introduction into the coating chamber. All of these heating sources can be used to facilitate vaporization of the polymer dispersion, and/or to attain a stable temperature of all materials prior to starting the coating process so as to improve and increase throughput of coated material.

In block 208, a fluidized bed comprising, consisting of, or consisting essentially of the second component of the electrode film mixture can be formed within the fluidized bed coating apparatus. In some embodiments, the second component of the electrode film mixture can be supplied into, and thus contained within, the fluidized bed coating apparatus in dry particles form. Forming the fluidized bed can comprise introducing dry particles of the second component and compressed gas, such as air, into the coating chamber of the fluidized bed coating apparatus simultaneously, or sequentially. For example, the second component can be contained within the coating chamber to form a "bed" of material, and the compressed gas can be flowed through the bed to form a "fluidized bed."

As a result of the vaporization step 206 and forming the fluidized bed step 208, and the flow dynamics of the polymer dispersion and second electrode film component within the coating chamber, a dry electrode mixture is formed, which includes particles of the second electrode film component coated with the dried polymer binder from the polymer dispersion. For example, forming the fluidized bed from the second component and vaporizing the liquid portion of the polymer dispersion can be performed simultaneously within the coating chamber of the fluidized bed coating apparatus, such that the second component can be coated by the dried polymer within the coating chamber.

In some embodiments, providing the second component within the fluidized bed coating apparatus comprises supplying the second component through a screw feeder, pneumatically, manually, or through another apparatus configured to supply particulate material through the second inlet.

As described herein, in some embodiments, the polymer dispersion is a water-based dispersion comprising particles of a polymer provided herein. In further embodiments, the polymer is PTFE. The polymer dispersion may be supplied to a first inlet of the fluidized bed coating apparatus such that droplets of the polymer dispersion can be distributed within a coating chamber of the fluidized bed coating apparatus. As described herein, in some embodiments, the second component comprises graphite. In some embodiments, a dry powder comprising dry particles of graphite may be supplied to a second inlet of the fluidized bed coating apparatus, and a fluidized bed comprising the graphite can be formed within the coating chamber of the fluidized bed coating apparatus. One or more components of the fluidized bed coating apparatus may be heated such that graphite particles of a desired dryness can be provided within the coating chamber, and the desired degree of vaporization of the liquid portion of the polymer dispersion can be achieved within the coating chamber. For example, the water and/or other liquid components of the polymer dispersion may be vaporized to provide a dried PTFE within the coating chamber of the fluidized bed coating apparatus. The aerosol comprising the graphite and the dried PTFE may be present within the coating chamber of the fluidized bed coating apparatus at the same time such that the dried PTFE can coat the particles of graphite within the coating chamber.

In some embodiments, dry particles of the second component are larger than a minimum size. In some embodiments, the dry particles may have a dimension, such as a diameter, a length, or a longest dimension, greater than about 3 microns ($\mu$m). In some embodiments, the approximate particle size of the second component can be 0.01 microns, 0.1 microns, 0.2 microns, 0.3 microns, 0.5 microns, 0.7 microns, 1 micron, 1.5 microns, 2 microns, 2.5 microns, 3 microns, or a range of values therebetween. In some embodiments, the polymer particles of the polymer dispersion droplets present within the fluidized bed coating apparatus can be no larger than a maximum size. In some embodiments, the polymer particles are atomized particles. For PTFE dispersions, the particle sizes may typically be less than 1-micron and typically 0.1 to 0.2-microns. With other solutions or dispersion of polymers, the particle sizes can be smaller, for example, 0.01 to 0.1 microns, or even less. In some embodiments, the approximate particle size of the polymer dispersion can be 0.01 microns, 0.03 microns, 0.05 microns, 0.1 microns, 0.2 microns, 0.3 microns, 0.5 microns, 0.7 microns, 1 micron, or a range of values therebetween. The nozzle can be configured to control the particle size. Other factors which may affect the polymer particle size include the concentration of the solution or dispersion, and in the case of dispersions, by the particle sizes in the dispersions themselves.

Figure 3:
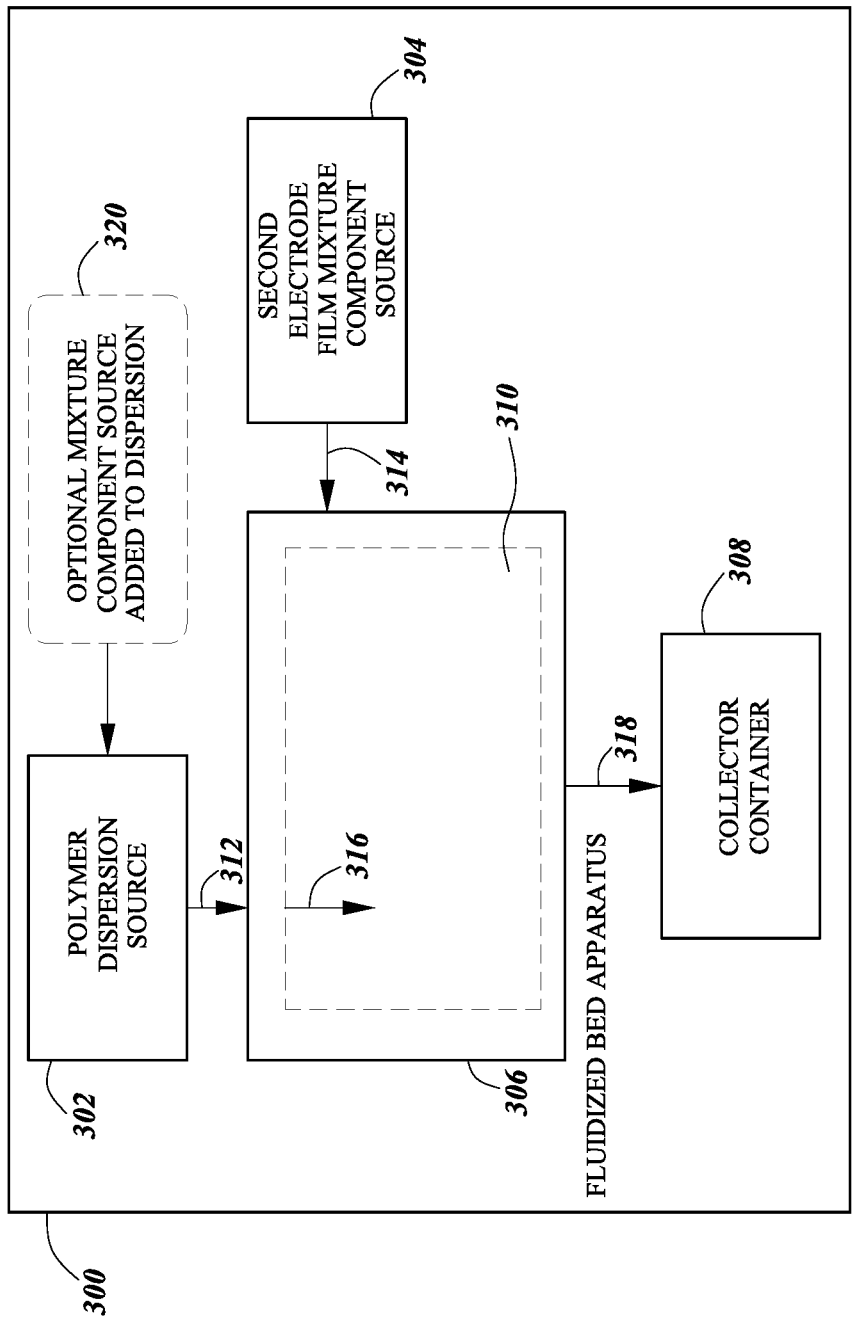
FIG. 3 is a schematic diagram of an embodiment of an apparatus for fabricating an electrode film mixture.

FIG. 3 is a schematic diagram of an example of an apparatus 300 for fabricating an electrode film mixture. In some embodiments, the process 200 described with reference to FIG. 2 can be performed using the apparatus 300. Referring to FIG. 3, the apparatus 300 may comprise a polymer dispersion source 302, a second electrode film mixture component source 304, a fluidized bed coating apparatus 306 (including a coating chamber 310), and a collector container 308. The polymer dispersion source 302 may comprise a polymer dispersion comprising a polymer and liquid as described herein. The polymer dispersion 302 may optionally include an additional mixture component. The additional mixture component may be, for example, a third electrode film mixture component as provided herein. The second electrode film mixture component source 304 may comprise a second electrode film mixture component as described herein. The polymer dispersion may be supplied from the polymer dispersion source 302 to a first inlet 312 of the fluidized bed coating apparatus 306. The second electrode film mixture component may be batch loaded into either an opened collector container 308 or fed substantially continuously through an opening, such as a second inlet 314, using a powder delivery method such as a screw feeder. The polymer dispersion may be supplied into the coating chamber 310 through a nozzle 316. Nozzle 316 can be separate from, or can be included as a component of, first inlet 312. Nozzle 316 can be configured to introduce the liquid polymer dispersion into the coating chamber 310 at various orientations in addition to the orientation shown. For example, nozzle 316 can be an upwardly, downwardly, tangential-spraying nozzle, or other orientations, to provide a top spray, bottom spray, tangential, or other spray orientation processes. The process provided can be an atomizing process.

A screw feeder, or other components can be used to batch introduce the second electrode film mixture component into the coating chamber 310 from the second inlet 314. In some embodiments, the polymer dispersion can be distributed as droplets within a coating chamber of the fluidized bed coating apparatus 306 such that the liquid portion of the polymer dispersion can be evaporated to provide a dried polymer, or particles thereof. A fluidized bed comprising the second electrode film mixture component can be simultaneously formed within the coating chamber of the fluidized bed coating apparatus 306 such that the dried polymer can coat the particles of the second component. In some embodiments, particles of the second electrode film mixture component coated with the dried polymer can exit the fluidized bed coating apparatus 306 through an outlet 318 and be collected in the collector container 308. A vortex can be formed, for example, by the flowing air within coating chamber 310, which can draw the second electrode component into the coating chamber, and allows for the coating process.

Figure 4:
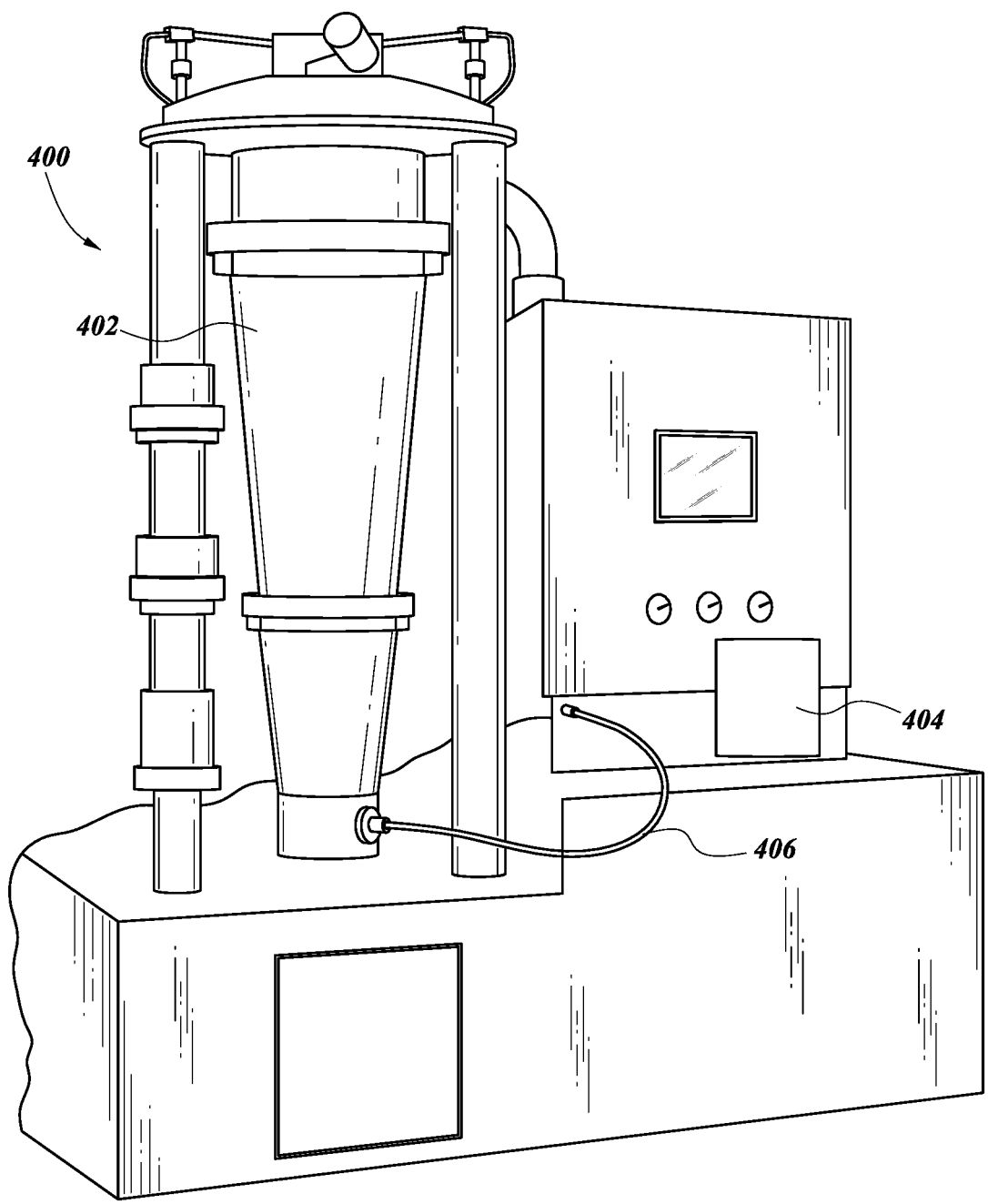
FIG. 4 shows an embodiment of an apparatus for fabricating an electrode film mixture.

FIG. 4 shows an embodiment of an apparatus 400 for fabricating an electrode film mixture. Apparatus 400 shows examples of some components of which might be employed with the apparatus 300 described with reference to FIG. 3, and/or the process described with reference to FIG. 2. Apparatus 400 can comprise a fluidized bed coating apparatus, such as a Wurster accelerator. Apparatus 400 can include a collector container 402, a polymer dispersion source 404 and an air source 406 for spraying polymer dispersion through an inlet and nozzle within the apparatus.

Figure 5:
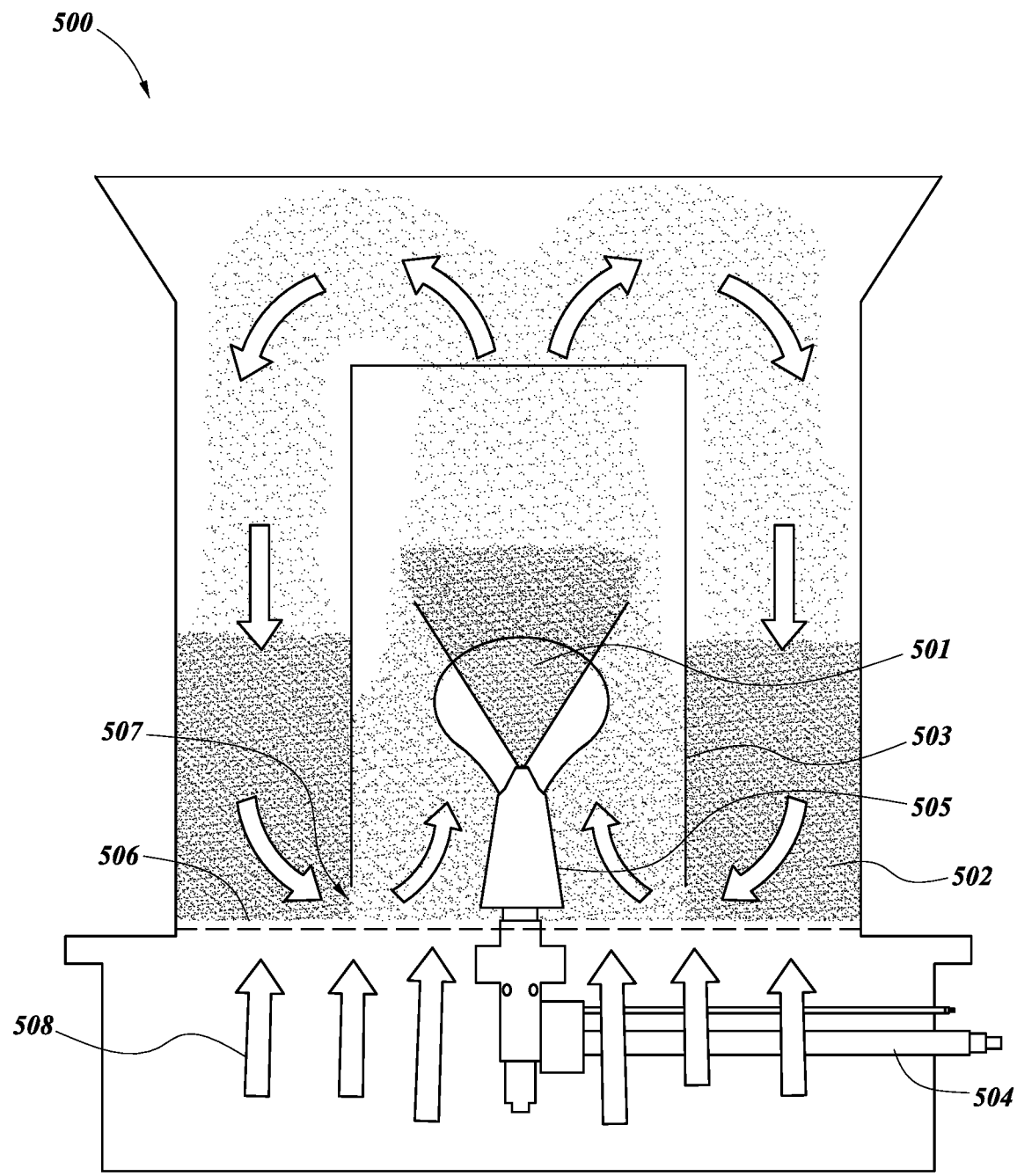
FIG. 5 shows a cross sectional view of an embodiment of a fluidized bed apparatus.

FIG. 5 shows a cross sectional view of an embodiment of a fluidized bed apparatus 500. Apparatus 500 can be similar to, or can comprise apparatus 400 shown in FIG. 4. As shown in FIG. 5, a polymer dispersion 501 can be provided within a coating chamber 503 of the apparatus 500. The polymer dispersion 501 can comprise a liquid and a polymer, wherein the polymer is a first component of an energy storage device electrode film mixture. The polymer dispersion 501 can be provided within the apparatus 500, for example, through an inlet 504. Inlet 504 can comprise, or can be in fluid communication with a nozzle 505, which can inject and/or spray the polymer dispersion 501 into the coating chamber 503. Nozzle 505 may provide a finely divided, for example, atomized polymer dispersion 501. Inlet 504 can be in fluid communication with an upstream polymer dispersion source (not shown). The polymer dispersion 501 can be heated, either directly or indirectly, to vaporize at least the liquid component of the polymer dispersion within apparatus 500 to form a dried, or substantially dry, polymer.

A second electrode film mixture component 502 can be provided, for example, through a batch loading process within the coating chamber 503. Component 502 can be provided, for example, through an inlet into apparatus 500 (not shown). The second component can be provided on a support 506, to form a bed of material. Gas 508, which may be heated gas, can be flowed through the bed of material to form a fluidized bed of component 502. For example, support 506 can include one or more apertures, which allow a stream of gas 508, such as air, to pass through support 506 and into the bed of second component 502, to form a fluidized bed. The fluidized bed of second component 502 and one or more portions of the polymer dispersion 501, such as a dried polymer, can be in fluid communication within the coating chamber 503, such that a portion of the polymer dispersion, such as the dried polymer, coats the component 502. The timing of when polymer dispersion is sprayed through nozzle 505 can be based upon a temperature measured within the apparatus 500, such as the temperature of the first mixture component, the second mixture component, the walls, and/or other components of apparatus 500.

Coating chamber 503 and support 506 may be configured to provide a gap 507 therebetween. When gas 508 is flowed through support 506, to form the fluidized bed of second component 502, and when the polymer dispersion 501 is sprayed into the apparatus 500, the gap 507 allows one or more of the electrode film mixture components within the apparatus 500 to move via the directional arrows shown, to form a rotating vortex. Such flow can increase the uniformity of the coating provided on second component 502 by the polymer within polymer dispersion 501. The height of gap 507, and/or the height of the walls of coating chamber 503, can be adjusted to control the characteristics of the vortex, such as its rate of flow. The proportions and shape of the coating chamber 503, the gap 507, and/or the nozzle 505, can also be adjusted to control the characteristics of the vortex. Such control can thus affect the coating uniformity.

In some embodiments, the spray nozzle can be positioned at or proximate to a lower distal portion of the fluidized bed coating apparatus (e.g., facing upwardly) and droplets of the polymer dispersion and a fluidized bed comprising the second electrode film mixture component can be formed within a coating chamber of the fluidized bed coating apparatus positioned above the spray nozzle. One or more components of the fluidized bed coating apparatus can be heated to facilitate desired vaporization of the liquid portion of the polymer dispersion and/or maintain desired dryness of the second electrode film mixture component, including the spray nozzle and/or one or more sidewalls of the fluidized bed coating apparatus. In some embodiments, the polymer dispersion can comprise water and a water soluble polymer or water dispersed polymer as a latex, such that the water is vaporized within the fluidized bed coating apparatus to provide dried polymer. In some embodiments, the second electrode film mixture component comprises dry particles of graphite, and a fluidized bed comprising graphite is formed within the fluidized bed coating apparatus using heated gas or air. Some of the atomized polymer dispersion may deposit on the vortexing particles, but the liquid may evaporate before the particles can coalesce. The dried polymer, such as dried PTFE, can coat the dry particles of the second electrode film mixture component, such as the dry particles of graphite, within the coating chamber of the fluidized bed coating apparatus.

Figure 6:
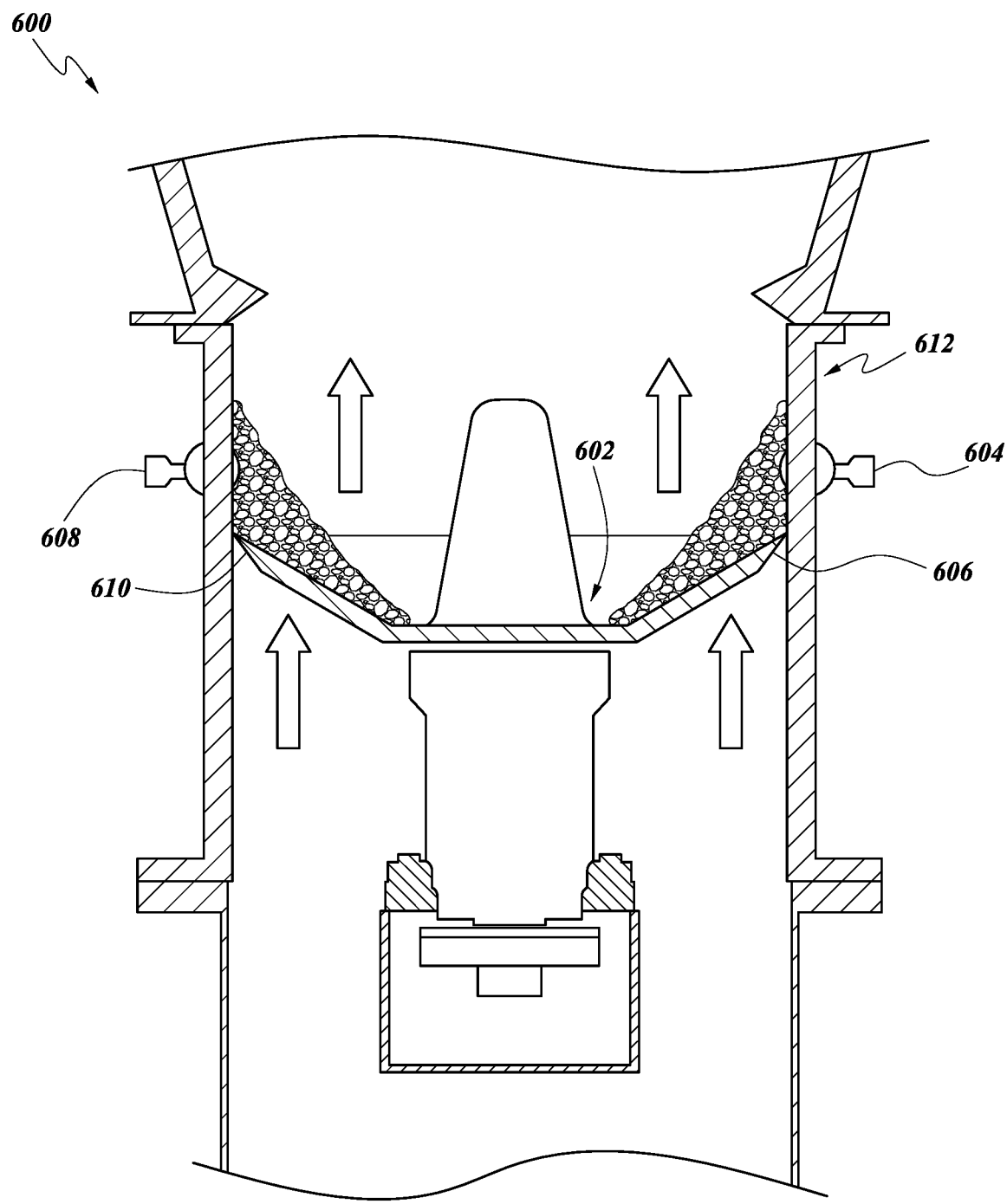
FIG. 6 shows a cross sectional view of an embodiment of a fluidized bed apparatus comprising a rotor.

FIG. 6 shows a cross sectional view of an embodiment of a fluidized bed apparatus 600. As shown in FIG. 6, a polymer dispersion can be provided within a stationary coating chamber 612 of the apparatus 600. The polymer dispersion may be as provided herein. The polymer dispersion can be provided within the apparatus 600, for example, through a nozzle 608, which can inject and/or spray the polymer dispersion into the coating chamber 612. Nozzle 608 may provide a finely divided, for example, atomized, polymer dispersion. Nozzle 608 can be in fluid communication with an upstream polymer dispersion source (not shown). The polymer dispersion can be heated, either directly or indirectly, to vaporize at least the liquid component of the polymer dispersion within apparatus 600 to form a dried, or substantially dry, polymer.

A second electrode film mixture component can be provided in coating chamber 612. In the example apparatus 600, a rotor 602 is included. The rotor 602 may be, for example, a flat rotor, a curved rotor, or a conical rotor. The rotor 602 may be smooth or textured. The second electrode film mixture component can be added in a batch, and/or can be added continuously through nozzle 604. The second component can be fluidized and circulated in coating chamber 612. Gas, such as heated gas, can be flowed through the bed of material to form a fluidized bed of the second electrode film mixture component. For example, flow of the gas can be coaxial to the rotor. The gas may be dry air. Gas can be in contact with and pass around rotor 602. The fluidized bed of the second electrode film mixture component and one or more portions of the polymer dispersion, such as a dried polymer, can be in fluid communication within the coating chamber 612, such that a portion of the polymer dispersion, such as the dried polymer, coats the second electrode film mixture component. The timing of when the polymer dispersion and/or second electrode film mixture component are added to coating chamber 612 can be based upon a temperature measured within the apparatus 600, such as the temperature of the first mixture component, the second mixture component, the walls, and/or other components of apparatus 600.

Coating chamber 612 and rotor 602 may be configured to provide a gap 606 therebetween. Gas flow allows one or more of the electrode film mixture components within the apparatus 600 to move, for example, via the directional arrows shown. Such flow can increase the uniformity of the coating provided on the second electrode film mixture component by the polymer within the polymer dispersion. The size and shape of the walls of coating chamber 612, the form and direction of the nozzles 604 and 608, the shape and texture of the rotor 602, can be adjusted to control the characteristics of the gas flow, such as its rate of flow. A person of skill in the art can adjust these parameters to achieve desired the coating characteristics.

In some embodiments, one or more electrode film mixtures described herein may be combined with one or more other electrode film components and subsequently calendered to form an electrode film. The electrode film may be one or more of the electrode films described with reference to FIG. 1. The electrode film may be incorporated in an energy storage device.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. A system for forming an energy storage device electrode film, comprising:
    a first source comprising a polymer dispersion, the polymer dispersion comprising a liquid and a polymer, wherein the polymer is a first component of an energy storage device electrode film mixture;
    a second source comprising a second component of the energy storage device electrode film mixture;
    a fluidized bed coating apparatus comprising a fluidized bed volume, a first inlet and a second inlet, the fluidized bed coating apparatus configured to receive the polymer dispersion from the first source through the first inlet into the fluidized bed volume, and the second component from the second source through the second inlet into the fluidized bed volume, and to form the electrode film mixture within the fluidized bed volume, wherein the first and second sources are different sources; and
    a calender apparatus configured to receive the electrode film mixture to form an electrode film;
    wherein the system does not comprise an electrode film drying apparatus.

2. The system of claim 1, wherein the fluidized bed coating apparatus is further configured to:
    vaporize the liquid of the dispersion to provide a dried polymer; and
    form a fluidized bed in the fluidized bed volume with the second component and coat the second component with the dried polymer.

3. The system of claim 1, wherein the second component comprises dry particles, and wherein the fluidized bed coating apparatus is further configured to form a fluidized bed in the fluidized bed volume from the dry particles.

4. The system of claim 1, wherein the second component comprises an active electrode component of the electrode film mixture.

5. The system of claim 4, wherein the second component comprises a lithium metal oxide.

6. The system of claim 1, wherein the second component comprises a carbon.

7. The system of claim 6, wherein the second component comprises graphite.

8. The system of claim 1, wherein the polymer comprises polytetrafluoroethylene.

9. The system of claim 8, wherein the liquid comprises water.

10. The system of claim 9, wherein the second component comprises dry particles, and wherein the fluidized bed coating apparatus is configured to receive the dry particles into the fluidized bed volume through the second inlet and form a fluidized bed from the dry particles.

11. The system of claim 10, wherein the fluidized bed coating apparatus is further configured to vaporize the water and provide a dried polytetrafluoroethylene coating on the dry particles.

12. The system of claim 1, wherein the fluidized bed coating apparatus is further configured to provide a continuous volume of gas to form a fluidized bed with the second component in the fluidized bed volume.

13. The system of claim 1, further comprising a rotor.

14. A method for preparing an energy storage device electrode film mixture using the apparatus of claim 1, comprising:
providing the polymer dispersion to the fluidized bed volume through the first inlet from the first source;
providing the second component to the fluidized bed volume through the second inlet from the second source;
vaporizing the liquid portion of the polymer dispersion within the fluidized bed volume to form a dried polymer; and
forming a fluidized bed of the dried polymer and the second component of the electrode mixture within the fluidized bed volume to form an electrode film mixture.

15. The method of claim 14, wherein providing the polymer dispersion comprises providing a dispersion comprising water and polytetrafluoroethylene.

16. The method of claim 14, wherein providing the second component comprises providing dry particles.

17. The method of claim 14, wherein providing the second component comprises providing an active electrode component of the electrode film mixture.

18. The method of claim 14, wherein providing the second component comprises providing a carbon.

19. The method of claim 18, wherein providing the carbon comprises providing graphite.

20. The method of claim 14, wherein providing the second component comprises providing a lithium metal oxide.

21. The method of claim 14, wherein vaporizing the liquid portion of the dispersion comprises passing the dispersion through a spray nozzle of the fluidized bed coating apparatus.

22. The method of claim 14, further comprising coating the second component with the dried polymer within the fluidized bed volume.

23. The method of claim 14, wherein providing the second component is performed prior to providing the polymer dispersion.

24. A method of forming an electrode film, comprising:
forming an energy storage device electrode film mixture using the method of claim 14; and
calendering the electrode film mixture to form an electrode film.

25. The method of claim 24, wherein calendering the electrode film mixture comprises fibrillizing the polymer.

26. The system of claim 1, wherein the system is configured to form a self-supporting electrode film.

* * * * *